Oct. 14, 1969      J. A. HASTINGS      3,472,486
VALVE
Filed Oct. 11, 1966
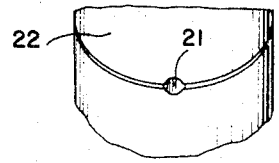
FIG. 2
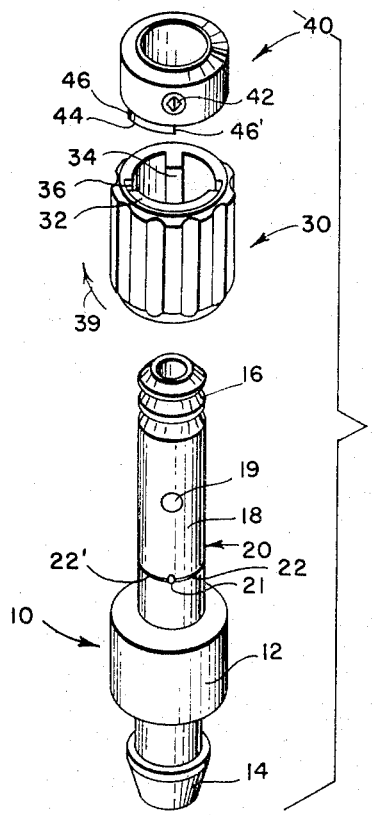
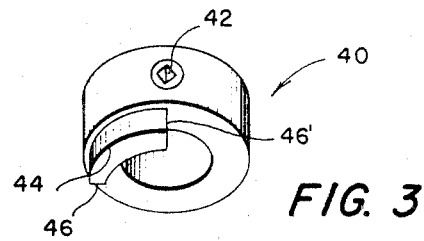
FIG. 3
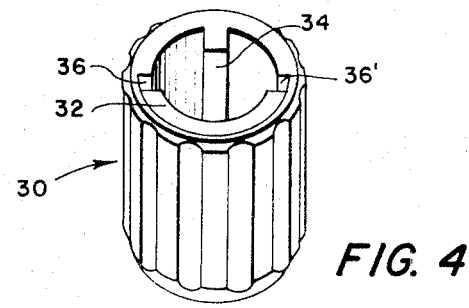
FIG. 4
FIG. 1
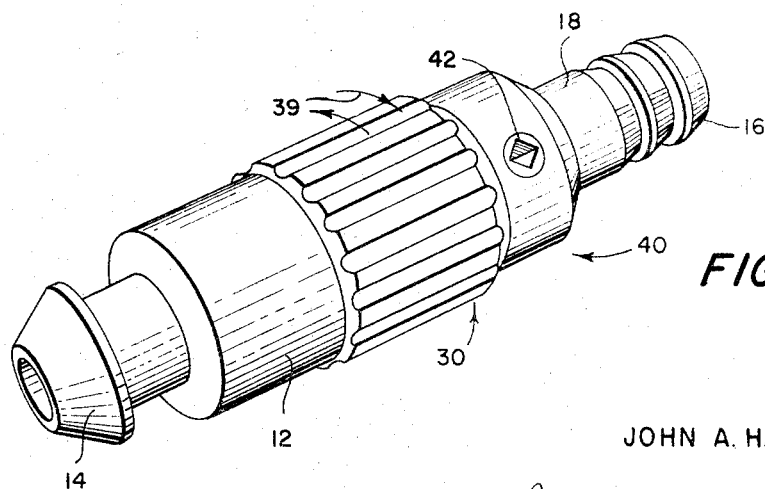
FIG. 5
INVENTOR
JOHN A. HASTINGS
BY *James C. Wray*
ATTORNEY

United States Patent Office 3,472,486
Patented Oct. 14, 1969

3,472,486
VALVE
John A. Hastings, South Yarmouth, Mass.
(31 Main St., Bass River, Mass. 02664)
Filed Oct. 11, 1966, Ser. No. 585,895
Int. Cl. F16k 15/18
U.S. Cl. 251—345                    10 Claims

ABSTRACT OF THE DISCLOSURE

Valves with annular cylindrical and concentric first and second members maintain pressure within the first member by blocking a radial port and convergent surface channel with a resilient sleeve forming the second member. As the sleeve is turned, the convergent end of the channel is exposed to an axial space between an internal channel covering and backing portions of the sleeve, relieving pressure within the first member through the port, channel and space to the atmosphere. In a preferred form the first member confines a check valve and is configured for insertion as a relief valve in sphygmomanometer apparatus.

---

This application broadly concerns valves having fine adjustment. Described herein as an example is a pressure bleed valve for sphygmomanometers.

Historically, fine control of the small quantities of fluid has been accomplished by using needle valves. In such valves, small fluid flows are established by reciprocating a tapered, needle-shaped plug in a small orifice of a valve seat. Some use has been made of valves having openings which are selectively covered by blocking means having uniformly varying dimensions.

Needle valves have disadvantages, and their prolonged use tends to wear away and deform the needles and the orifices. When needle valves are turned to shut off flow, the particular construction of the valves requires that there be very small contact between the needles and the orifices. Although forces used in operating needle valves are not great, the extremely small contact areas between complementary surfaces develop relatively high pressures, which are responsible for causing wear. When fluid is shut off, the plugs or needles are forced tightly against the seats, and repeated opening and closing of the valves scores and diminishes the plugs and enlarges the seats. The fine control characteristics of the valves thus are deteriorated by prolonged use. Moreover, repeated jamming of the needles against the seats causes the valves to stick and renders smooth operation difficult if not impossible. Because conventional needle valves require two sets of screw threads and tapered matching parts, careful machining is required, and the valves are expensive. The inherent tendency of the relatively rotating and reciprocating parts to erode and to distort requires that the valves be made of expensive materials.

Another type of valve for controlling fluid flow uses gradually varying blocking means to provide fine control. The selected matching of one part with another prevents the establishing and the controlling of extremely small flow rates. It is furthermore difficult to hold the blocking means in precise three dimensional relationship to the valve seat. Any uncontrolled displacement of the blocking means and the valve seat allows unwanted and uncontrolled fluid flow. Moreover, precisely aligning one part with another part presents difficulty and requires accurate machining.

All valves become dirty, and dirt and foreign matter interfere with operation and prevent accurate control of flow. Although in most needle valves, the needle easily may be removed from the valve, normal construction of the valve makes it extremely difficult to obtain access to the orifices. Consequently, cleaning needle valves is difficult.

The present invention overcomes the disadvantages of known valves by providing longitudinally converging channels laterally extending from ports. A blocking means covers the port and the channel, and by moving the blocking means, flow is permitted through successive portions of the channel having gradually varying transverse dimensions. The valve elements slide smoothly, and there is no relative axial displacement of the elements. Opening and closing forces are normal to the ports, and there are no extraordinary forces at the ports. Due to increased bearing surfaces and improved materials, the valves of the present invention have extended life. The new valves are cheaper to construct since no intricate machining operations are required, and they have a more compact and streamlined exteriors than known valves offering similar fine control.

The valves operate by successively exposing portions of uniformly increasing channels. Adjusting the valve leaves the shape of the opening unchanged and significantly affects no flow characteristics other than volume. Moreover, a contiguous opening is presented to the fluid flow rather than the annular opening of the well-known needle valve.

The present valves are self cleaning; fluid flow sweeps any foreign matter upward and out of the channels; and, upon closing, blocking members wipe remaining foreign matter away from the ports and channels.

One objective of this invention is the provision of a valving device having two relatively movable elements, at least one of the elements defining a valve port, at least one of the elements defining a channel opening into the port, and the elements cooperating to selectively block the port and the channel.

Another objective of this invention is the provision of valving apparatus having two elements, one of which defines a port having a converging channel laterally extending therefrom, and the other of which comprises a blocking means for selectively exposing portions of the channel to fluid transmission means.

Another objective of this invention is the provision of the valving method comprising selectively opening an elongated channel having uniformly increasing transverse dimension by moving a blocking means over the channel, thereby changing the transverse dimension of an opening formed by a section of the channel and the blocking means.

A further objective of this invention is the provision of a sphygmomanometer pressure bleed valve comprising an elongated channel having uniformly varying transverse dimensions and means for selectively blocking portions of the channel.

Other objectives of this invention will be apparent from this specification and from the example illustrated in the drawings, in which:

FIGURE 1 is an exploded view of a sphygmomanometer valve;

FIGURE 2 is a detail of the port and valving channel;

FIGURE 3 is an enlarged view of the cap, showing the stop means for the blocking sleeve;

FIGURE 4 is an enlarged view of the polyethylene sleeve having an inward projecting blocking means, which selectively covers the valving port and channel, and having limit means which cooperates with the stop means of the valve cap, shown in FIGURE 3; and FIGURE 5 is an assembled view of the valve.

Referring to FIGURE 1, the numeral 10 generally represents the main body of the valve, which has an axial central fluid transmission passage. Enlarged portion 12 of valve body 10 contains a conventional check valve, which permits fluid flow only in an upward direction within the passage. Extremeties 14 and 16 of valve body 10 are configured to receive pressure hoses and to hold the hoses in sealing engagement with the valve body. Cylindrical portion 18 of valve body 10 has a depression 19 to receive a single set screw, which holds the valve elements assembled.

Fine flow control apparatus 20 includes a valve port 21, which extends through the wall of cylinder 18 to the central fluid passage. Valving channels 22 extend outwardly from port 21 along a partial circumference of a section of cylinder 18.

Sleeve 30 has an inward projecting blocking means 32, which extends longitudinally from the lower limit of the sleeve to a line below the upper limit of sleeve 30. Backing strip 34 projects inwardly from sleeve 30 to hold blocking means 32 tightly against port 21 and channels 22. Limit means 36 and 36' provide positive stops which limit the turning of sleeve 30 on cylinder 18. The fluted or grooved construction of the outer surface of sleeve 30 provides flexibility of the sleeve and allows the sleeve to slightly vary from a circular cross-section when the sleeve is installed, so that backing member 34 and blocking means 32 create a sealing force normal to the surface of cylinder 18.

Cap 40 has a set screw 42 which turns into depression 19 in cylinder 18 to hold the sleeve and cap assembled on the valve body 10. Downwardly projecting segmental lug 44 cooperates with stops 36 and 36' in sleeve 30 to limit rotational movement of the sleeve with respect to the fixed cap 40 and valve body 10.

If the valve elements were assembled in the relative positions shown in FIGURE 1, stop 36 would rest against edge 46 of lug 44. In that stopped position, blocking means 32 completely seals port 21 and valving grooves 22. Rotating sleeve 30 in the direction shown by arrow 39 removes blocking means 32 from the extreme right end portion of channel 22. Fully turning sleeve 30 in the direction shown by arrow 39, so that stop 36' rests against edge 46' of lug 44, completely exposes port 21 to the longitudinal fluid passage of sleeve 30, so that air may escape from the inner passage of cylinder 18. FIGURES 2, 3, and 4 are enlarged details of the apparatus shown in FIGURE 1. Of particular interest in FIGURE 2 is that channels 22 uniformly converge outwardly from port 21.

When the valve is used with sphygmomanometer apparatus, a conventional squeeze bulb pump may be connected to nipple 14 of the valve; blood pressure sampling and measuring apparatus is connected to nipple 16. Sleeve 30 is twisted to its maximum left hand position, counter to arrow 39, and pressure is pumped up through check valve 12. After a maximum blood pressure reading is taken, moving sleeve 30 in the direction shown by arrow 39 adjusts the rate of pressure bleed from the test apapratus.

Operation of the present valve is far easier than operation of needle valves which are conventionally attached to sphygmomanometer apparatus. The present valve is free from the propensity for damage and the difficulty in release which often are associated with needle valves. Needle valves are subject to damage by turning the needles tightly to shut off fluid flow, and it is difficult to smoothly open the valves. The present valves come to rest against positive stops which are not in the fluid flow path, which can cause no damage, and which provide easy opening of the valves. Moreover, the present valves are self cleaning; dirt is wiped from the surface of cylinder 18 by the leading edge of blocking means 32 as sleeve 30 is turned to the closed position.

I claim:

1. A valve comprising first outer and second inner concentrically disposed annular cylindrical valve members, a first fluid transmission means connected to the first member, a second fluid transmission means connected to the second member, a port in the first member connecting the first transmission means with an interface between the members, longitudinally converging channel means in one of the members selectively interconnecting the second transmission means with the port, and means to move the members relatively in the direction of the channel, wherein said second member defines a flexible sleeve having a fluted outer surface, having a segmental inwardly projecting blocking means extending from a first longitudinal limit of the sleeve to lines spaced from a second longitudinal limit of the sleeve, having an inwardly projecting backing member opposite said blocking means, and having more than one inwardly projecting stops adjacent the second longitudinal end of the sleeve.

2. The valve apparatus of claim 1 further comprising third annular member fixed externally on said first annular member and having a longitudinally projecting lug extending into the second end of the second annular member, and said lug cooperating with said stops, thereby limiting rotational movement of said second annular member with respect to said first annular member.

3. A valve comprising first and second concentrically disposed annular valve members, a first fluid transmission means connected to the first member, a second fluid transmission means connected to the second member, a check valve positioned internally in the first member limiting flow through the first member and the first fluid transmission means in one direction, a port in the first member connecting the first transmission means with an interface between the members, longitudinally converging channel means in one of the members selectively interconnecting the second transmission means with the port, and means to move the members relatively in the direction of the channel.

4. The valve apparatus of claim 3, wherein the first fluid transmission means comprises a chamber axially extending through the first member.

5. The valve apparatus of claim 4 wherein the second fluid transmission means comprises an axial space in the second member between a first portion of the second member forming an interface with the first member and a second portion of the second member opposite the first portion and holding the first portion against the first member.

6. The valve apparatus of claim 5 wherein the second member comprises a flexible sleeve surrounding the first member.

7. The valve apparatus of claim 5 further comprising first and second stop means respectively connected to the first and second members to limit selective movement of said members in the direction of the channel means between a first point wherein the segmental blocking portion completely covers the port and channel means and a second point wherein the port and channel means are uncovered by the blocking portion, through intermediate points wherein the blocking portion covers the port and portions of the divergent end of the channel means.

8. The valve apparatus of claim 7 wherein the second stop means comprises a segmental recess in one axial end of the second member, and wherein the first stop means comprises a projection mounted on the first member and extending into the recess in the second member.

9. Valve apparatus comprising first and second valve members having cylindrical walls, having diverse diameters, and being concentrically disposed one within the other, the members having mutually opposed medial cylindrical surfaces at least portions of which are radially spaced from one another thereby defining axial space between the members, the second member having an integrally formed segmental blocking portion extending toward the first member and terminating in a curved face adjacent a medial surface of the first member, and the second member having a support portion on the medial surface thereof opposite the segmental blocking portion, the support portion engaging the medial surface of the first member thereby holding the segmental portion in contact with the medial surface of the first member and holding the first and second members in assembled position, a port extending through a cylindrical wall of the first member opposite the segmental blocking portion of the second member and convergent channel means extending opposite the segmental portion from a divergent end adjacent the port to a convergent end spaced from the port, whereby portions of the channel means are selectively exposed adjacent the blocking portion by rotating the second member with respect to the first member, thereby selectively communicating the port in the second member through the channel means to an axial space between the members.

10. A sphygmomanometer valve comprising: an elongated annular open ended valve body having first and second ends, said first end being configured for connection to a fluid pressure supply, and said second end being configured for connection to blood pressure sensing and measuring apparatus, the interior of said body defining a first fluid transmission means, a check valve disposed within the interior of said body, limiting fluid flow from said first end to said second end, a port radially extending through a wall of said body intermediate said check valve and said second end, at least one channel defined on the exterior surface of said body communicating with said port and converging outwardly from said port; an annular sleeve member being fitted over said body, said sleeve member having an internally projecting blocking member complementary to said port and said channel, a backing member extending inwardly from said sleeve opposite the blocking member, and stop means inwardly projecting from said sleeve; retaining means attached to said body and abutting the sleeve, said retaining means having a lug extending into the sleeve, said lug cooperating with said stop means in the sleeve, thereby limiting rotational movement of said sleeve with respect to the valve body and the port and channel.

References Cited
UNITED STATES PATENTS

| | | | |
|---|---|---|---|
| 1,810,331 | 6/1931 | Wilhjelm | 137—584 |
| 2,911,008 | 11/1959 | De Bois | 137—625.31 |
| 1,980,085 | 11/1934 | Perry et al. | 138—43 |
| 2,693,338 | 11/1954 | Grunt | 251—340 |
| 2,709,566 | 5/1955 | Davis | 251—340 XR |
| 2,715,512 | 8/1955 | Miller et al. | 251—340 XR |
| 2,833,311 | 5/1958 | Baldelli | 138—43 |
| 3,039,463 | 6/1962 | Dickey et al. | 251—345 XR |
| 3,148,703 | 9/1964 | Kachline | 138—43 XR |

SAMUEL SCOTT, Primary Examiner